(12) United States Patent
Onishi et al.

(10) Patent No.: US 12,451,770 B2
(45) Date of Patent: Oct. 21, 2025

(54) ROTATING ELECTRICAL MACHINE

(71) Applicant: Mitsubishi Electric Corporation, Tokyo (JP)

(72) Inventors: Yoshihiko Onishi, Tokyo (JP); Isao Sonoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 92 days.

(21) Appl. No.: 18/269,695

(22) PCT Filed: Apr. 26, 2021

(86) PCT No.: PCT/JP2021/016646
§ 371 (c)(1),
(2) Date: Jun. 26, 2023

(87) PCT Pub. No.: WO2022/230021
PCT Pub. Date: Nov. 3, 2022

(65) Prior Publication Data
US 2024/0322657 A1    Sep. 26, 2024

(51) Int. Cl.
*H02K 11/33*    (2016.01)

(52) U.S. Cl.
CPC .......... *H02K 11/33* (2016.01); *H02K 2211/03* (2013.01)

(58) Field of Classification Search
CPC ........ H02K 9/227; H02K 11/30; H02K 11/33; H02K 2211/03; H02K 9/00; H02K 11/38
USPC .................................................. 310/64, 68 R
See application file for complete search history.

(56) References Cited

U.S. PATENT DOCUMENTS

| 7,023,699 | B2 * | 4/2006 | Glovatsky .......... | H05K 7/20454 361/708 |
|---|---|---|---|---|
| 2004/0013544 | A1 | 1/2004 | Kimura et al. | |
| 2014/0339966 | A1 * | 11/2014 | Tomizawa ............ | H02K 11/33 310/68 D |
| 2016/0037659 | A1 | 2/2016 | Yamanaka | |
| 2017/0349206 | A1 | 12/2017 | Asao et al. | |
| 2018/0127020 | A1 * | 5/2018 | Asao ...................... | H02K 11/33 |

(Continued)

FOREIGN PATENT DOCUMENTS

| JP | 2010-16979 A | 1/2010 |
|---|---|---|
| JP | 6146380 B2 | 6/2017 |
| JP | 6350763 B2 | 7/2018 |

(Continued)

OTHER PUBLICATIONS

Extended European Search Report issued May 22, 2024 in Application No. 21939184.4.

(Continued)

*Primary Examiner* — Alexander A Singh
(74) *Attorney, Agent, or Firm* — Sughrue Mion, PLLC

(57) ABSTRACT

A rotating electrical machine includes a control board that has a control circuit portion on a main first surface, a power circuit portion, and a heat dissipating portion that covers the power circuit portion, a holder that opposes a second main surface of the control board which is an opposing surface to the first main surface, and a support member that supports the holder, wherein the holder includes a plurality of protrusions that project towards the second main surface, and at least a portion of the plurality of protrusions are disposed so as to overlap with the power circuit portion in a plan view.

10 Claims, 6 Drawing Sheets

(56) References Cited

U.S. PATENT DOCUMENTS

2018/0343737 A1 11/2018 Morimoto et al.
2019/0140520 A1* 5/2019 Sato ...................... H02K 11/33

FOREIGN PATENT DOCUMENTS

WO  2016/163037 A1  10/2016
WO  2019/064793 A1  4/2019

OTHER PUBLICATIONS

International Search Report for PCT/JP2021/016646 dated, Jul. 6, 2021 (PCT/ISA/210).
Office Action issued Dec. 19, 2023 in Japanese Application No. 2023-516876.

* cited by examiner

ROTATING ELECTRICAL MACHINE

CROSS REFERENCE TO RELATED APPLICATIONS

This application is a National Stage of International Application No. PCT/JP2021/016646 filed Apr. 26, 2021.

TECHNICAL FIELD

The present disclosure relates to a rotating electrical machine.

BACKGROUND ART

In conventional rotating electrical machines (for example, an engine or the like), a structure to dissipate heat to a heat sink through a heat dissipating material is provided to dissipate heat of a heating element (for example, a switching element or the like) of a control board. In such a structure, the control board, is screw-fixed to a motor configuration component such as a housing or the like, and typically has a control circuit component and a power circuit component that are mounted together. The heat dissipating material is provided in the power circuit component, and heat dissipation from a top surface of the power circuit component to the heat sink is assured (Refer to Patent Documents 1 and 2).

CITATION LIST

Patent Documents

[Patent Document 1]
   Japanese Patent No. 6146380
[Patent Document 2]
   Japanese Patent No. 6350763

SUMMARY OF INVENTION

Problem to be Solved by the Invention

In Patent Document 1, a configuration in which a protrusion is provided on an opposing surface of a heat sink is described. The height of the protrusion is set to be larger than a height of electronic components mounted on a main surface of a control board. From this, when warping occurs on the control board, contact between the heat sink and the electronic components is avoided. However, the protrusion and a heat dissipating material are formed on the same surface. For this reason, when an external load is applied to the heat dissipating material to enhance an adhesion between the control board and the heat dissipating material, it is not possible to suppress warping and distortion of the control board that bends to the opposite side of the protrusion during assembly.

In Patent Document 2, a configuration in which a control board is fixed to a heat sink through a heat dissipating material is described. A protrusion of a truncated cone shape is formed in the heat sink, and a hole corresponding to the protrusion is formed in the control board, so that the a gap between the heat sink and the control board is utilized to reduce warping of the control board. However, due to variations in a shape of the protrusion and the hole, it is difficult to stably suppress the warping and distortion of the control board.

The present disclosure has been made in order to address the problems above, and provides a rotating electrical machine where it is possible to suppress warping and distortion of a control board.

Means to Solve the Problem

A rotating electrical machine according to the present disclosure includes a control board that has a control circuit portion on a first main surface, a power circuit portion, and a heat dissipating portion that covers the power circuit portion, a holder that opposes a second main surface of the control board which is an opposing surface to the first main surface, and a support member that supports the holder, wherein the holder includes a plurality of protrusions that project towards the second main surface, and at least a portion of the plurality of protrusions are disposed so as to overlap with the power circuit portion in a plan view.

Effects of the Invention

According to the present disclosure, it is possible to provide a rotating electrical machine that is capable of suppressing warping and distortion of a control board.

DESCRIPTION OF EMBODIMENTS

Figure 1:
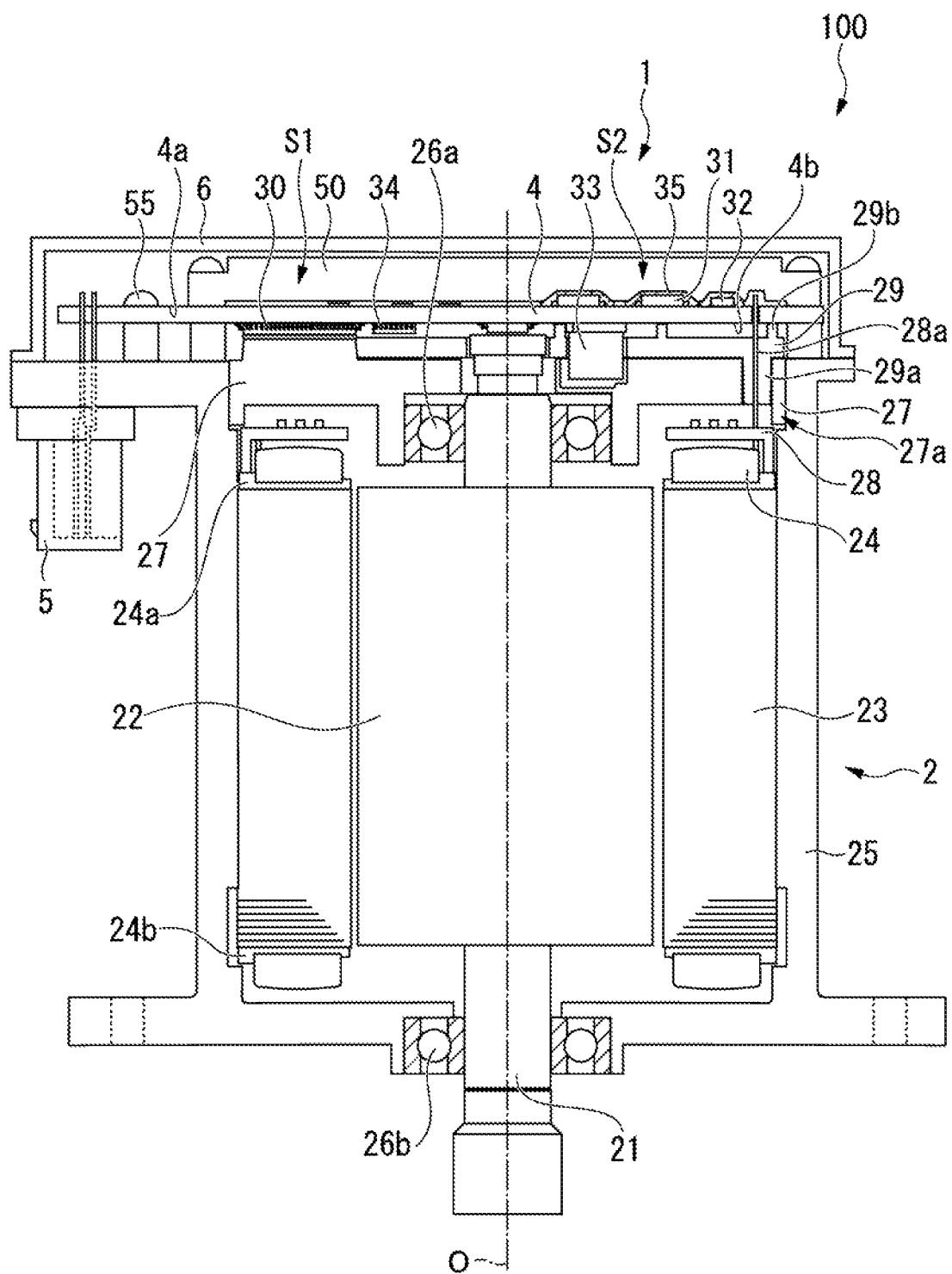
FIG. 1 is a schematic cross-sectional view of a rotating electrical machine according to a present embodiment.

FIG. 1 is a schematic cross-sectional view of a rotating electrical machine 100 according to a present embodiment, taken orthogonally with respect to an axial direction. As the rotating electrical machine, an inner rotor electric generator, or an electric motor or the like may be mentioned. In the present embodiment, explanations are carried out using the electric motor as an example.

In the present embodiment, an axial direction along an axis center O of the rotating electrical machine 100 is referred to as the "axial direction". A cross-section orthogonal to the axial direction is referred to as a "transverse section". In the transverse section, a direction that intersects the axis center O is referred to as a "radial direction".

The rotating electrical machine 100 includes a control unit 1 and a multi-phase winding motor 2.

The control unit 1 includes a control board 4 to mount a control circuit portion S1 and a power circuit portion S2, a connector 5 disposed to connect to an edge of the control board 4, a heat sink 50 connected to the control board 4, and a cover 6 that contains the control board 4 and the heat sink 50.

A plurality of electronic components of the control circuit portion S1 and the power circuit portion S2 are mounted on a first main surface 4a that is in an upper portion in the axial direction of the control board 4. As the control board 4, a typical glass epoxy circuit board suffices, and the circuit board 4 is about 1 to 2 mm thickness in the present embodiment. In the control circuit portion S1, a CPU 30 and an IC 34 or the like are mounted. In the power circuit portion S2, a switching element 31, a shunt resistor 32, a capacitor 33, and a choke coil (not shown) or the like are mounted. The switching element 31 and the shunt resistor 32 of the power circuit portion S2 are both covered by a heat dissipating material 35. Heat generated by the power circuit portion S2 is dissipated to the heat sink 50 through a heat dissipating material 35. From the heat dissipating material 35, it is possible to insure a wider surface area needed for dissipating heat efficiently, and it is possible to stably dissipate heat to the heat sink 50.

The control board 4 is fixed to a case 25 of the motor 2 or a support member 27 mentioned later on by a plurality of screws 55. Power and information input from the connector 5 pass through a terminal, and are supplied to each of the control circuit portion S1 and the power circuit portion S2.

The motor 2 is mainly configured from a rotational (output) shaft 21 having the axis center O, a rotor 22, a stator 23, a case 25, the support member 27, and a holder 29. A plurality of pairs of permanent magnets not shown are disposed in a periphery of the rotor 22. A multiphase winding 24 that is wound around a bobbin 24a, 24b is disposed in the stator 23. A terminal portion 28a extending from an end of the winding 24 streches above in the axial direction, and connects to the power circuit portion S2 of the control board 4 through a hole 27a of the support member 27.

The holder 29 is supported by the support member 27, and is disposed between the support member 27 and a second main surface 4b of a lower portion of the axial direction that is an opposing surface to the first main surface 4a of the control board 4. The holder 29 is formed of an insulative resin material so as not to affect a performance of the rotating electrical machine 100 even if the second main surface 4b of the control board 4 contacts a plurality of second protrusions 29b. A first protrusion (joint protrusion) 29a and the plurality of the second protrusions 29b are formed in the holder 29. The first protrusion 29a is formed on an end in a radial direction of the holder 29 avoiding the power circuit portion S2, and projects in a direction opposite to a direction of the second main surface 4b towards the motor 2. The first protrusion 29a has an approximately cylindrical shape which has a through hole in a center, and fits with the hole 27a of the support member 27. From this, it is possible to improve positioning accuracy of the control unit 1 and the motor 2. The plurality of the second protrusions 29b have an approximately cylindrical shape, and project towards the second main surface 4b (details to be explained later on).

In the motor 2, an annular terminal portion 28 that extends to the control unit 1 is disposed above the winding 24 in the axial direction, and is connected to an end of the winding 24. By having the terminal portion 28a go through the through hole of the first protrusion 29a, the motor side and the control board are connected, while insuring insulative properties of the support member 27 and the annular terminal portion 28. Bearings for rotating the output shaft 21 are each disposed above and below the axial direction of the output shaft 21 (bearing 26a, 26b). The upper bearing 26a is disposed in a vicinity of a center of the support member 27. Here, the support member 27 is a boundary of the control unit 1 and the motor 2, as well as a lid of the motor 2. The case 25 contains the components of the motor 2 mentioned above.

Figure 2A:
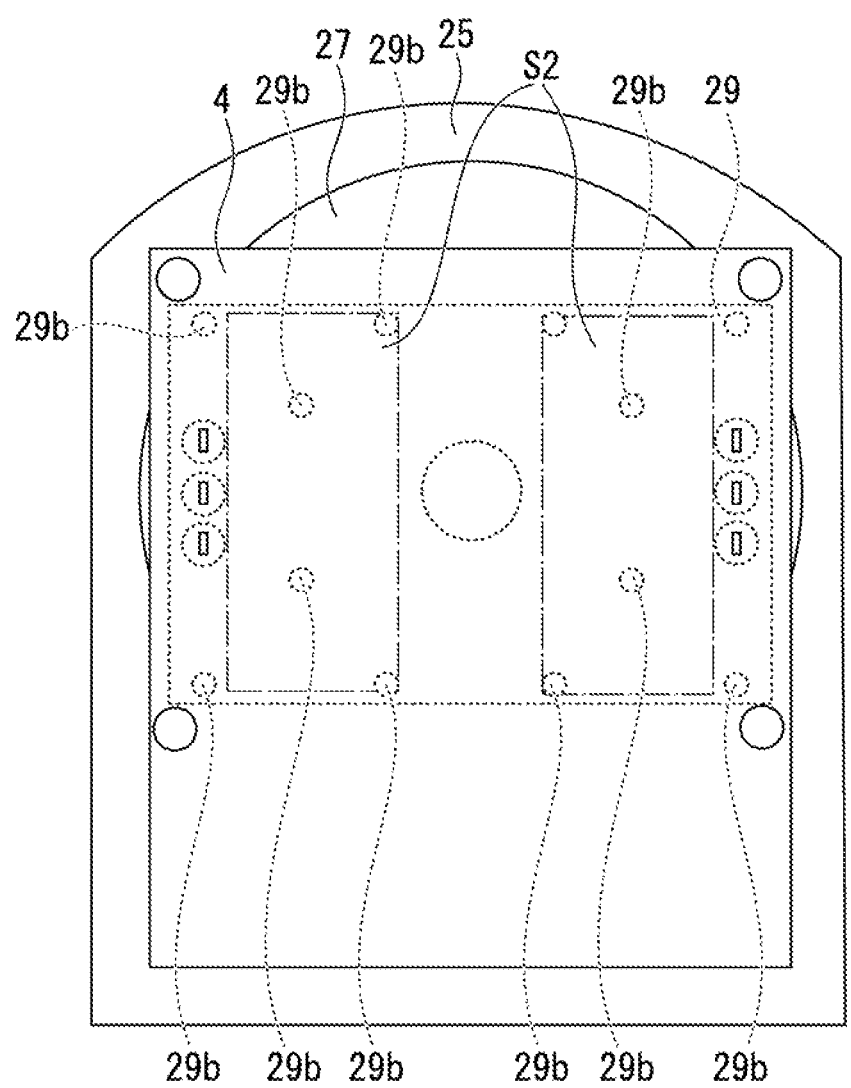
FIG. 2A is a top view.
Figure 2B:
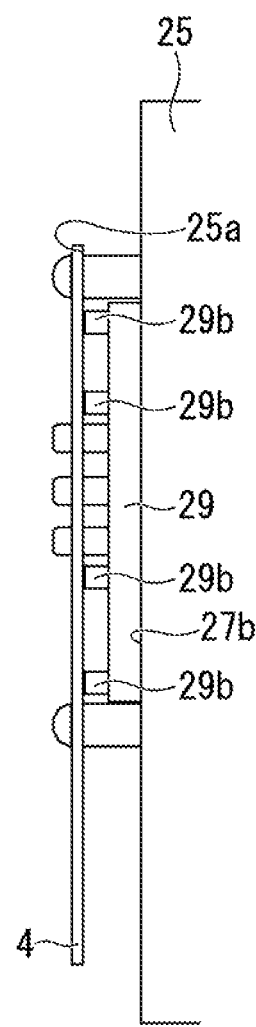
FIG. 2B is a side view of a control board and a holder according to a present embodiment.

FIG. 2A is a top view of the control board 4 of the control unit 1 and the holder 29, and FIG. 2B is a side view thereof. Here, an example of the control unit 1 having two systems of the power circuit portion S2 is shown.

In the present embodiment, the plurality of second protrusions 29b projecting from the holder 29 are formed in a region of the holder 29 that faces the power circuit portion S2 towards the second main surface 4b of the control board 4. Out of the plurality of the second protrusions 29b, at least a portion are disposed so as to overlap with the power circuit portion S2 in a plan view. A height of the plurality of the second protrusions 29b is set to be less than or equal to a height of a screw-fixing surface 25a in the axial direction. The screw-fixing surface 25a is a surface that contacts the second main surface 4b where the case 25 and the control board 4 are screw-fixed. The screw-fixing surface 25a is parallel to the radial direction.

During assembly of the heat sink 50, even if an external load is applied to enhance an adhesion of the heat dissipating material 35 with the power circuit portion S2 and the control board 4, by having the control board 4 contact the second protrusions 29b of the holder 29, it is possible to suppress warping and distortion of the control board 4.

In addition, it is possible to combine the various embodiments, and the various embodiments may be modified or omitted as deemed appropriate.

Figure 3:
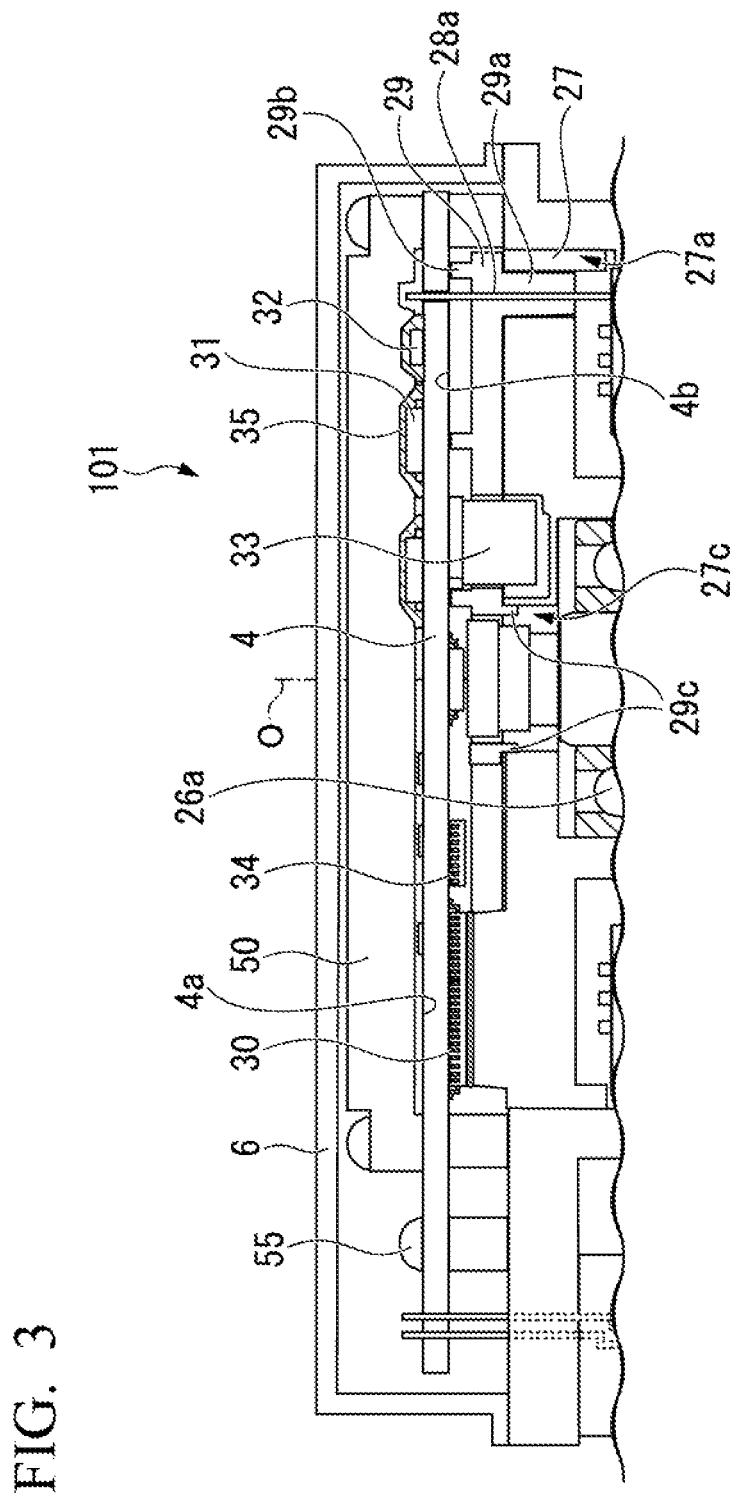
FIG. 3 is a cross-sectional view of a heat dissipating structure of the rotating electrical machine according to a modification example of the present embodiment.

For example, FIG. 3 shows a part of a heat dissipating structure of a control unit 101 and the motor 2 of the rotating electrical machine 100 according to a modification example of the present embodiment. Explanations of similar components to the components of the embodiments mentioned above are omitted.

The holder 29 that is formed of the insulative resin material, and is disposed between the control board 4 and the support member 27, may further have an annular protrusion 29c. The annular protrusion 29c projects in a direction opposite to a direction towards the second main surface 4b, and is formed so as to be fitted near an upper end of the axial direction of the output shaft 21 with the axis center O as a center of the axis towards the motor 2. The annular protrusion 29c is fitted with a hole 27c that the output shaft 21 goes through near the vicinity of the center of the support member 27.

Figure 4A:
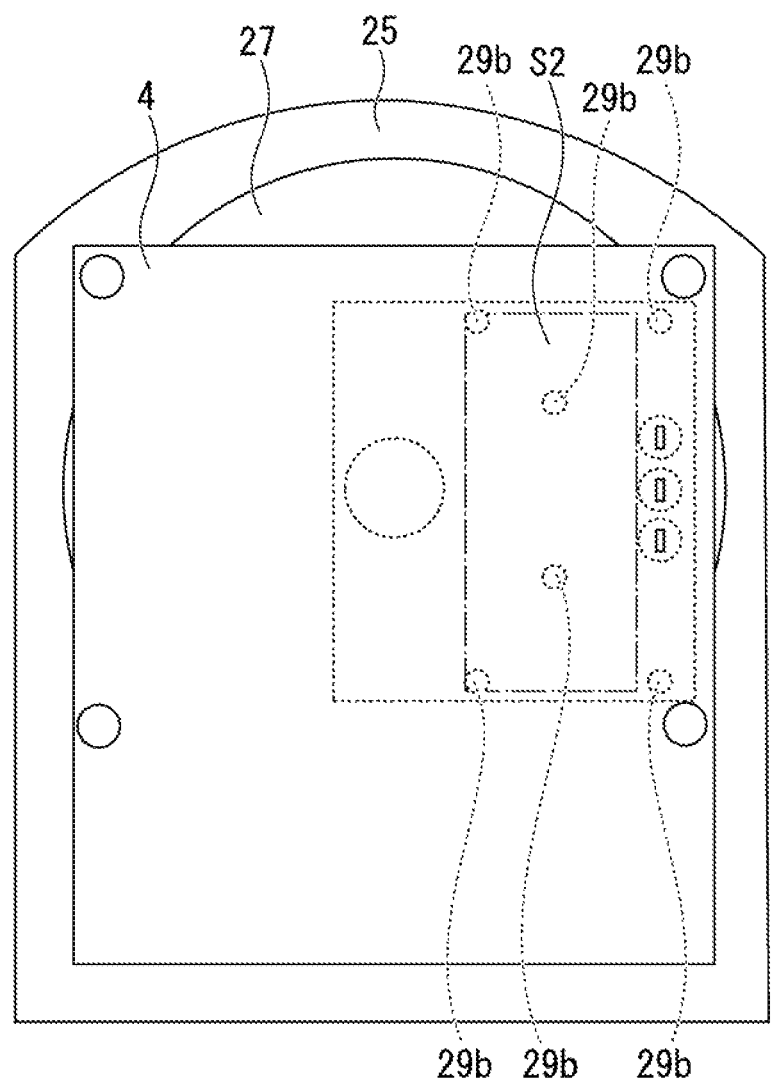
FIG. 4A is a top view.
Figure 4B:
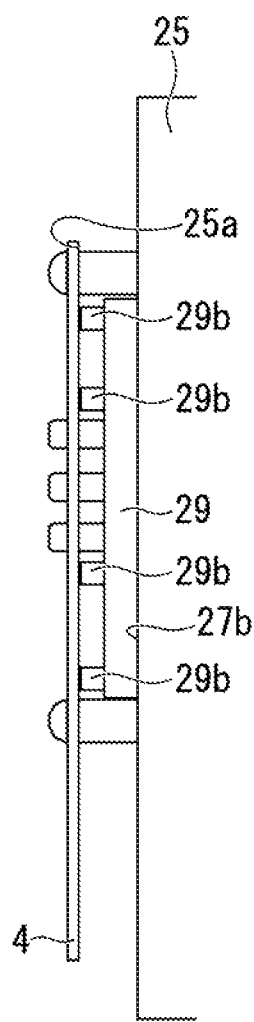
FIG. 4B is a side view of the control board and the holder according to a modification example of the present embodiment.

By further providing the annular protrusion 29c, it is possible to improve positioning accuracy of the control unit 1 and the motor 2. Such a configuration is also an effective configuration with respect to positioning accuracy of a case of one system of the power circuit portion S2, as shown in the example of FIG. 4A and FIG. 4B.

Henceforth, an example of the rotating electrical machine 100 in any of the embodiments mentioned above is used in an automobile is assumed. In such a case, environmental (surrounding) temperatures in which the rotating electrical machine 100 is used vary from −40 degrees C. to 140 degrees C.

To achieve stable motor characteristics in such environmental temperatures, as a material of the case 25 of the motor 2, the support member 27, and the heat sink 50, it is possible to at least use either an aluminum die-cast material or an aluminum alloy. In the case of the aluminum die-cast material, the coefficient of thermal expansion, is for example $21 \times 10^{-6}$ (1/K), as is the coefficient of thermal expansion for an ADC12 which has a large market volume. In the case of the aluminum alloy, the coefficient of thermal expansion, is for example the coefficient of thermal expansion of an A1100 of $24 \times 10^{-6}$ (1/K) which has a high thermal conductivity, and a good heat dissipation performance.

As the holder 29, it is possible to use a resin material having a coefficient of thermal expansion in a direction of flow being anywhere from $20\times10^{-6}$ to $30\times10^{-6}$ (1/K). In this manner, by suppressing a difference in values between the coefficients of thermal expansion of configuration components of the motor 2 and of the heat sink 50, even if the environmental temperatures in which a finished product after assembly is used are between −40 degrees C. to 140 degrees C., it is possible to further efficiently suppress the warping and distortion that is generated in the control board 4.

Regarding the resin material of the holder 29, for example, by using PBT (polybutylene terephthalate), PPS (polyphenylene sulfide), or nylon (using about 30% glass filler strengthener), it is possible to achieve the coefficient of thermal expansion mentioned above. By using such materials, it is possible to further efficiently suppress the warping and distortion that is generated in the control board 4.

A number of a first protrusion and a second protrusion is not limited to the embodiments and the modification examples above, and may be set accordingly.

According to any one of the embodiments and the modification examples mentioned above, it is possible to further efficiently suppress the warping and distortion that is generated in the control board 4, and it is possible to stably dissipate heat of the power circuit portion S2 of the control board 4 to the heat sink 50. By suppressing the warping and distortion of the control board, it is possible to prevent voltage drops, short circuits, and solder damage of electronic components or the like, making it possible to provide a high quality rotating electrical machine. In other words, it is possible to improve the heat dissipation performance to the heat sink 50, stabilization, and reliability of mounted components of the control board. By making the configuration that suppresses warping of the control board 4, it is possible to make the solders of mounted electronic components smaller, contributing to down-sizing and weight savings of the control board 4.

REFERENCE SIGNS LIST

1 . . . Control Unit
2 . . . Motor
4 . . . Control Board
5 . . . Connector
6 . . . Cover
21 . . . Output (Rotation) Shaft
22 . . . Rotor
23 . . . Stator
24 . . . Winding
24a, 24b . . . Bobbin
25 . . . Case
26a, 26b . . . Bearing
27 . . . Support Member
28 . . . Annular Terminal Portion
28a . . . Terminal Portion
29 . . . Holder
29b . . . Second Protrusion
29c . . . Annular Protrusion
30 . . . CPU
34 . . . IC
31 . . . Switching Element
32 . . . Shunt Resistor
33 . . . Capacitor
35 . . . Heat Dissipating Material
50 . . . Heat Sink
100 . . . Rotating Electrical Machine
S1 . . . Control Circuit Portion
S2 . . . Power Circuit Portion

The invention claimed is:

1. A rotating electrical machine comprising:
a control board that has a control circuit portion on a main first surface, a power circuit portion, and a heat dissipating portion that covers the power circuit portion;
a holder that opposes a second main surface of the control board which is an opposing surface to the first main surface; and
a support member that supports the holder and comprises a through hole; wherein
the holder includes a plurality of protrusions that project towards the second main surface and a joint protrusion that projects in a direction away from the second main surface and through the through hole, and
at least a portion of the plurality of protrusions are disposed so as to overlap with the power circuit portion in a plan view.

2. The rotating electrical machine according to claim 1, wherein:
each of the plurality of protrusions has a height that is less than or equal to a height of a screw-fixing surface where the control board is screw-fixed to the support member.

3. The rotating electrical machine according to claim 1, wherein:
the joint protrusion has a through hole which connects the control board and a motor.

4. The rotating electrical machine according to claim 3, wherein:
the holder comprises an annular protrusion that projects in a direction away from the second main surface, and that is fitted near an upper end of an output shaft of the motor.

5. The rotating electrical machine according to claim 1, further comprising a motor; and
a case in which the holder, the support member, the control board, and the motor are housed.

6. The rotating electrical machine according to claim 1, further comprising a motor that is rotatable about an axis, wherein the holder is disposed between the support member and the control board with respect to an axial direction corresponding to the axis.

7. The rotating electrical machine according to claim 6, wherein the holder is disposed at an axial end of the motor.

8. A rotating electrical machine comprising:
a control board that has a control circuit portion on a main first surface, a power circuit portion, and a heat dissipating portion that covers the power circuit portion;
a holder that opposes a second main surface of the control board which is an opposing surface to the first main surface; and
a support member that supports the holder; wherein
the holder includes a plurality of protrusions that project towards the second main surface,
at least a portion of the plurality of protrusions are disposed so as to overlap with the power circuit portion in a plan view, and
the holder is formed of a resin material, and a coefficient of thermal expansion of the resin material in a direction of flow being anywhere from $20\times10^{-6}$ to $30\times10^{-6}$ (1/K).

9. The rotating electrical machine according to claim 8, wherein:

the support member is formed of an aluminum die-cast material, and a coefficient of thermal expansion of the aluminum die-cast material is $21 \times 10^{-6}$ (1/K).

10. The rotating electrical machine according to claim 8, wherein:
the support member is formed of an aluminum alloy, and a coefficient of thermal expansion of the aluminum alloy is $24 \times 10^{-6}$ (1/K).

* * * * *